Dec. 4, 1951 — C. E. DILLON — 2,576,925
METHOD AND APPARATUS FOR SMOKING
AND TENDERIZING MEAT PRODUCTS
Original Filed Aug. 10, 1946 — 3 Sheets-Sheet 1

Inventor
Clyde E. Dillon
By Fishburn & Mullendore
Attorneys

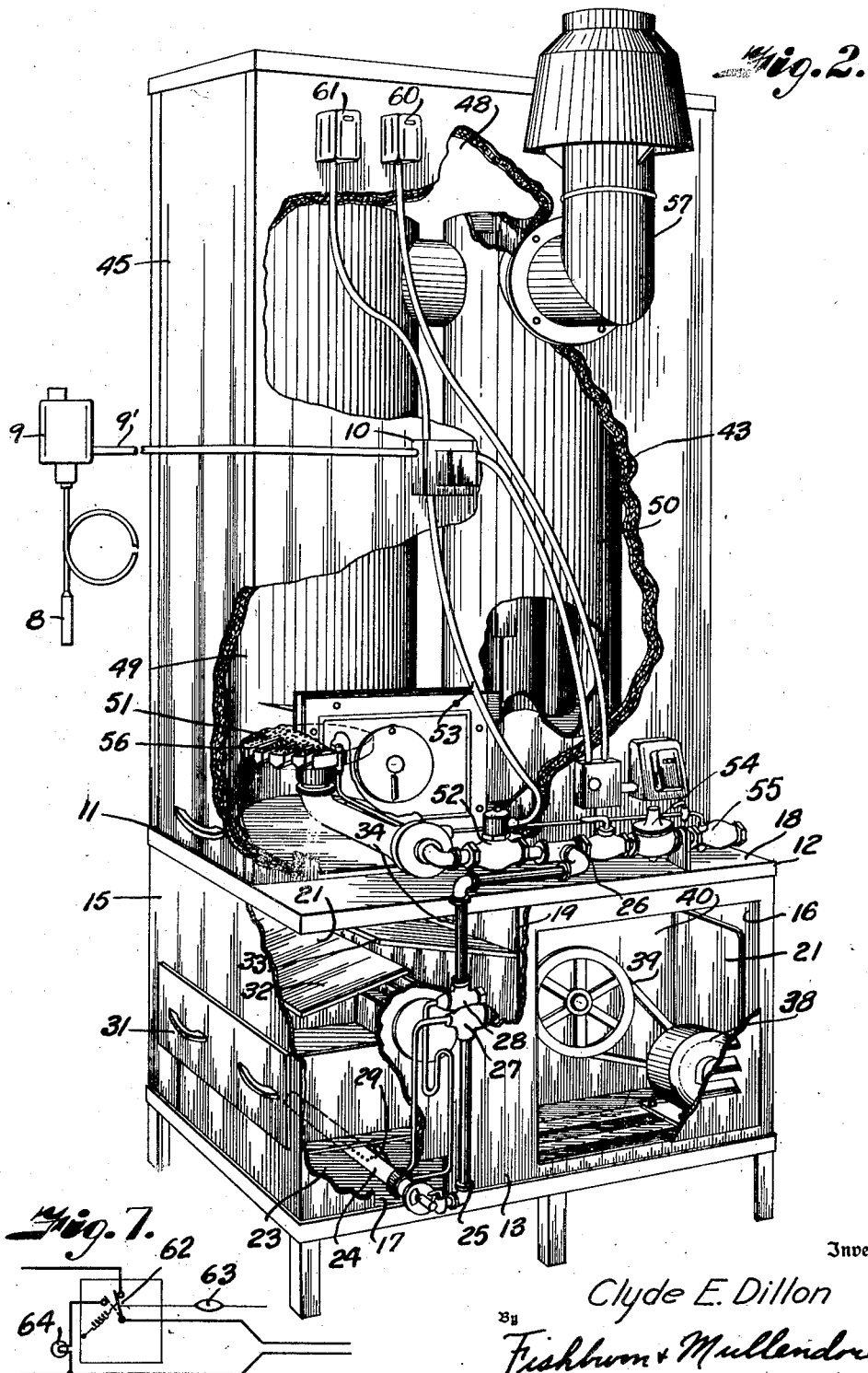

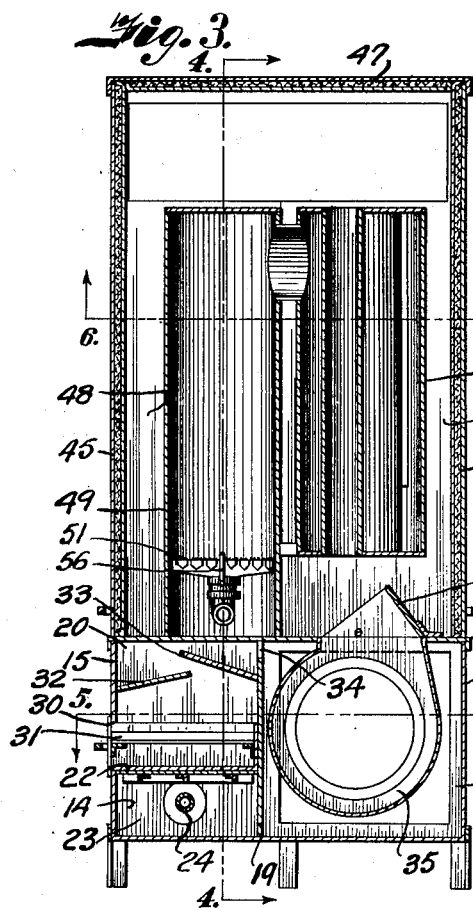

Patented Dec. 4, 1951

2,576,925

UNITED STATES PATENT OFFICE 2,576,925

METHOD AND APPARATUS FOR SMOKING AND TENDERIZING MEAT PRODUCTS

Clyde E. Dillon, Kansas City, Mo., assignor, by mesne assignments, to Raymond H. Starr, Kansas City, Mo.

Continuation of application Serial No. 689,685, August 10, 1946. This application December 4, 1948, Serial No. 63,558

4 Claims. (Cl. 99—259)

This invention relates to a method and apparatus for smoking and tenderizing meat products and is a continuation of my copending application, Serial No. 689,685, filed August 10, 1946, now abandoned and titled "Apparatus for Producing Smoke Used in Curing Meats and Other Food Products," the invention described in the present application being an improvement in that it provides better method and equipment for controlling the smoke and variable temperatures required in tenderizing meats, particularly hams or similar food products that are cooked or semi-cooked during the smoke treatment.

Other objects of the invention are to provide for generating smoke and supplying the smoke to a heated air and smoke mixture that is kept in constant circulation through treating and heat generating zones; to provide for regulating the heat to maintain the smoke flow at the differential temperatures required during stages of treatment; to provide substantially quick response and accurate control of the temperature changes; and to provide heat application to the flow in a manner which is conservative in the use of the smoke.

Other objects of the invention are to provide a smoke generator and heating unit of simple unitary construction; to provide a smoke generating and heating unit particularly adapted for operation with gaseous fuels; and to provide a unit wherein the evolved smoke and heated air are kept free from contamination by the fuel or products of combustion.

In accomplishing these and other objects of the invention, I have provided an improved method and apparatus illustrated in the accompanying drawings, wherein:

Fig. 2 is an enlarged perspective view of the smoke generating and heating unit with parts broken away to better illustrate the interior construction.

Fig. 3 is a vertical section through the unit on the line 3—3 of Fig. 4.

Fig. 4 is a vertical section on the line 4—4 of Fig. 3.

Fig. 5 is a horizontal section on the line 5—5 of Fig. 3.

Fig. 6 is a horizontal section on the line 6—6 of Fig. 3.

Fig. 7 is a wiring diagram diagrammatically illustrating the safety control switch.

Figure 1:
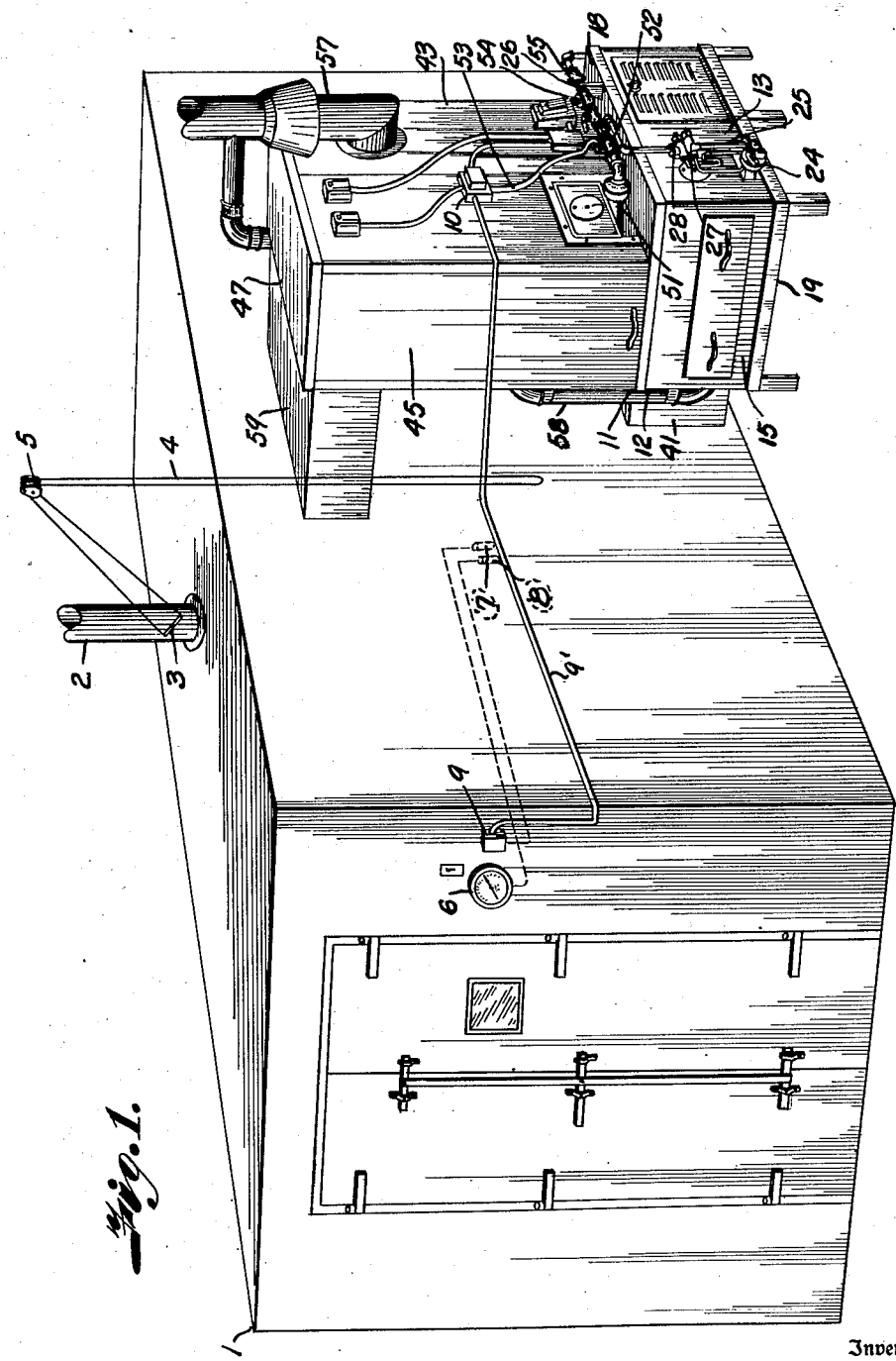
Fig. 1 is a perspective view of a smokehouse and smoke generating and heating unit constructed in accordance with the present invention.

Referring more in detail to the drawings:

I designates a smokehouse of any approved construction to provide a smoke-tight interior treating compartment or zone through which a mixed flow of heated air and smoke is maintained in circulating contact with food products to be smoked and tenderized, the food products being suitably supported in the treating compartment in a conventional manner to obtain desired contact with the smoke and heat. The smokehouse is provided with a suitable vent 2 having a control damper indicated by the operating lever 3, the lever being manipulated by flexible cables 4 running over a pulley unit 5 to suspend the operating cables in convenient position alongside of the smokehouse. The smokehouse is provided with various accessories including a temperature indicator 6 located on an exterior wall thereof and which is energized by a thermostat element 7 located within the treating compartment. The treating compartment also contains a temperature responsive element 8 that controls a switch 9 which is connected through a suitable conduit 9' with a junction box 10 carried as a part of the smoke generating and heating unit 11 now to be described.

The smoke generating and heating unit includes a casing composed of a base section 12 having front and rear walls 13—14, end walls 15—16, a bottom 17 and a top 18. The base section also includes a partition 19 extending transversely between the front and rear walls to provide a smoke generating compartment 20 at one end and a fan compartment 21 at the other. The smoke generating compartment 20 is provided with a horizontal partition 22 to provide a burner compartment 23 closed from the upper smoke space. Mounted in the compartment 23 is a burner 24 that is supplied with a gaseous fuel through a pipe 25 leading from a manifold 26 later described. Connected into the pipe 25 is a control valve 27 and a pilotstat valve 28 to shut off flow of fuel to the burner in case the flame from the burner pilot 29 becomes extinguished. Slidable through an opening 30 in the wall 15 is a drawer 31 adapted to contain a smoke generating material such as sawdust over the heat of the flame from the burner 24. Positioned within the smoke generating space, in staggered relation, are staggered baffles 32 and 33 for providing a tortuous passage for the smoke as it is removed from the smoke generating space through an outlet 34 formed in the partition 19 under suction of a circulating fan 35 located in the fan compartment 21.

The circulating fan has an inlet 36 from the fan compartment and has a discharge nozzle 37 extending through the top 18. The fan is operated by a motor 38 through a pulley and belt connection 39 as shown in Figs. 2 and 5, the motor being located in a compartment separated from the fan compartment by a partition 40. Air is drawn by the fan into the fan compartment from the smokehouse through a connecting duct 41 and is discharged through the nozzle 37 into the heating section that is mounted on the base section. A suitable spark stopping screen 42 or the equivalent is provided in the duct to prevent sparks from being circulated with the air and smoke mixture.

The heating section 41 includes insulated front and rear walls 43—44, side walls 45—46 and a top 47 to form an air heating chamber 48. Located in the air heating chamber is a heating unit 49 including interconnected radiator 50 to cooperate with the exterior surfaces of the radiator and combustion chamber in providing a maximum of hot surfaces to be contacted by the air flow passing through the air heating chamber. Mounted in the lower end of the combustion chamber is a burner 51 that is connected with the manifold 26.

Connected into the manifold 26 intermediate the connection of the pipe 25 and the burner, is an electrically operated valve 52 that is energized by the thermostat switch 9 responsive to the thermostatic element 7 located within the treating compartment of the smokehouse and whereby temperature in the smokehouse is maintained at predetermined temperatures by controlling operation of the burner. The valve 52 is connected with the junction box 10 by a conduit 53. The manifold is also provided on the upstream side of the pipe 25 with a pressure regulating valve 54 and a pilotstat valve 55 which is kept open responsive to operation of the pilot 56 which effects ignition of the gas discharged from the burner 51 when the gas supply is open to the burner by means of the electrically operated valve 52.

The combustion chamber of the heating unit is connected at the upper end with a flue outlet 57 that is adapted to be connected to a chimney or other suitable vent (not shown). The burner chamber 23 is vented to the flue 57 by means of a branch pipe 58 as best shown in Fig. 1.

The upper end of the air treating compartment is connected with a pipe 59 which leads into the smokehouse as indicated in Fig. 1. The electric circuit for circulating fan 35 is controlled by a switch 60 mounted on the front of the upper section of the smoke generating and heating unit as shown in Fig. 2. The temperature control circuit is adapted to be opened and closed by a similar switch 61 mounted adjacent the switch 60 as shown in Fig. 2. Located at some point in the electric circuit which controls operation of the main burner and fan 35 is a switch 62 that is operated by a fusible link 63 located in the flow of heated air to or from the smokehouse so that in case of fire the fusible element will operate to effect opening of the switch 62 and closing circuit with a signal device 64 as shown in Fig. 7.

In operating the apparatus constructed and assembled as described, and assuming that the pilot burners 29—56 are lighted to start operation of the burners 24 and 51, the products to be treated are placed in the treating compartment of the smokehouse and a quantity of smoke generating material, such as wood chips, shavings or sawdust, is placed in the drawer 31. The heat from the burner 24 chars the material so that smoke is evolved in the smoke chamber and passes around the baffles 32 and 33 into the fan compartment 21 when the fan 35 is placed in operation. The air from the smokehouse is drawn therefrom, through the duct 41 and discharged along with the smoke into the heating section where the air flows in contact with the heating surfaces of the heater unit 49 and the hot smoke and heated air is discharged through the pipe or duct 59 into the smokehouse where the heated air and smoke act upon the products to be cured.

In smoking and tenderizing meat products such as ham, the mixture of heated air and smoke is discharged into the smokehouse where the heat and smoke contacts the hams, after which it is returned to the heating and smoke generating unit under operation of the fan, the fan again discharging the mixture in heat exchanging relation with the surfaces of the heater to maintain the temperature and return the air and smoke mixture to the smokehouse. It is thus obvious that the smoke and heated air is continuously cycled while additional smoke is being added to the flow by the suction of the fan on the smoke generating compartment through the opening 34. The thermostat 9 is adjusted to maintain a constant temperature in the treating zone during the initial treatment while a constant supply of smoke is being generated for addition to the flow of heated air being circulated. After a period of time the thermostat is adjusted to raise the temperature in the treating compartment and the system is operated under high heat at constant temperature during the final treatment of the product. During this period the smoke generation is maintained at a constant rate.

From the foregoing it is obvious that I have provided a method and apparatus for smoking and tenderizing meats whereby variable constant temperatures can be maintained during different stages of treatment so as to smoke and tenderize meats such as hams and the like. It is also obvious that I have provided a system wherein the temperature of the circulated air may be regulated without decreasing or increasing the rate of smoke generation.

What I claim and desire to secure by Letters Patent is:

1. A housing having a treating chamber, a casing separate from the housing, circulating ducts connecting the casing with the housing for circulating an air and smoke mixture from the casing through the treating chamber back to the casing, means in the casing for heating the mixture, separate means in the casing for generating smoke, a fan in the casing for maintaining said circulation and drawing smoke from the smoke generator for addition to said mixture, means for controlling operation of the heating unit, means in the path of the heated mixture to actuate said control means, a circuit including the fan and said burner control means, a switch in said circuit, and a fuse element controlling said switch and located in the path of said mixture.

2. A self-contained smoke generating and air heating unit including a casing, means dividing the casing into smoke generating and fan compartments and a heating compartment, said casing having an inlet opening into the fan compartment and an outlet from the heating chamber, heating means in the smoke generating compartment for activating a smoke generating material, an air heating unit in the heating compartment including a fuel burner, means controlling flow of fuel to the burner, said fan compartment having an inlet from the smoke generating compartment, a fan in the fan compartment for drawing air and smoke into the fan compartment and having a discharge into the heating compartment for circulating the air and smoke mixture in contact with the heating unit for heating said mixture prior to discharge through said outlet, a temperature responsive element in the path of the heater mixture discharged through said outlet, and an operating connection between said element and said fuel controlling means for maintaining a temperature of the mixture as set by the temperature responsive element.

3. A self-contained smoke generating and air heating unit including a casing, means dividing the casing into smoke generating and fan compartments and a heating compartment, said casing having an inlet opening into the fan compartment and an outlet from the heating chamber, heating means in the smoke generating compartment for activating a smoke generating material, an air heating unit in the heating compartment including a fuel burner, means controlling flow of fuel to the burner, said fan compartment having an inlet from the smoke generating compartment, a fan in the fan compartment and having a discharge into the heating compartment, a motor for actuating the fan for circulating the air and smoke mixture in contact with the heating unit for heating said mixture prior to discharge through said outlet, an electrical current supplying the motor, a switch in said circuit, a temperature responsive element in the path of the heated mixture discharged through said outlet, and operating connection between said element and said fuel controlling means for maintaining temperature of the mixtures as set by the temperature responsive element, a second temperature responsive element in the path of the heated mixture discharged through said outlet and an operating connection between said second temperature responsive element and the switch for controlling the motor responsive to temperature of the mixture.

4. A self-contained smoke generating and air heating unit including a casing, means dividing the casing into smoke generating and fan compartments and a heating compartment, said casing having an inlet opening into the fan compartment and an outlet from the heating chamber, heating means in the smoke generating compartment for activating a smoke generating material, an air heating unit in the heating compartment including a fuel burner, means controlling flow of fuel to the burner, said fan compartment having an inlet from the smoke generating compartment, a fan in the fan compartment and having a discharge into the heating compartment, a motor for actuating the fan for circulating the air and smoke mixture in contact with the heating unit for heating said mixture prior to discharge through said outlet, an electrical circuit supplying the motor, a switch in said circuit, a temperature responsive element in the path of the heated mixture discharged through said outlet, and an operating connection between said element and said fuel controlling means for maintaining temperature of the mixture set by the temperature responsive element and a fuse element controlling said switch and located in the path of said mixture to open said circuit upon fusing of said element.

CLYDE E. DILLON.

REFERENCES CITED

The following references are of record in the file of this patent:

UNITED STATES PATENTS

| Number | Name | Date |
|---|---|---|
| 1,010,327 | Trescott | Nov. 28, 1911 |
| 1,275,959 | Martin et al. | Aug. 13, 1918 |
| 1,719,353 | Alsop | July 2, 1929 |
| 1,882,904 | Reid | Oct. 18, 1932 |
| 2,013,479 | Robinson | Sept. 3, 1935 |
| 2,266,131 | Thon | Dec. 16, 1941 |
| 2,312,339 | Jones | Mar. 2, 1943 |
| 2,333,505 | Allen | Nov. 2, 1943 |
| 2,380,428 | Gilliam | July 31, 1945 |